United States Patent [19]

Tsujimoto et al.

[11] 4,033,923
[45] July 5, 1977

[54] COLORING RESINS BY MIXING NAPHTHACENEQUINONES THEREWITH

[75] Inventors: Michihiro Tsujimoto, Tachikawa; Ryoichi Tsukahara, Yokohama; Tsutomu Nishizawa, Kamakura; Ichiro Okubo, Hachioji, all of Japan

[73] Assignee: Mitsui Toatsu Chemicals, Incorporated, Tokyo, Japan

[22] Filed: Feb. 4, 1976

[21] Appl. No.: 655,011

Related U.S. Application Data

[62] Division of Ser. No. 544,820, Jan. 28, 1975, Pat. No. 3,986,826.

[30] Foreign Application Priority Data

Feb. 7, 1974 Japan ............................ 49-14892

[52] U.S. Cl. .......................... 260/37 N; 260/37 NP; 260/37 P; 260/39 P
[51] Int. Cl.² .................. C08L 77/02; C08L 61/20; C08L 67/00
[58] Field of Search ............. 260/37 N, 37 P, 39 N, 260/559 AT

[56] References Cited

UNITED STATES PATENTS 3,074,975  1/1963  McCormick et al. ........ 260/559 AT

FOREIGN PATENTS OR APPLICATIONS 2,337,855  2/1974  Germany ........................... 8/39 R Primary Examiner—Donald Levy
Attorney, Agent, or Firm—Lane, Aitken, Dunner & Ziems

[57] ABSTRACT

Method of coloring an organic material with a naphthacenequinone derivative having the formula:

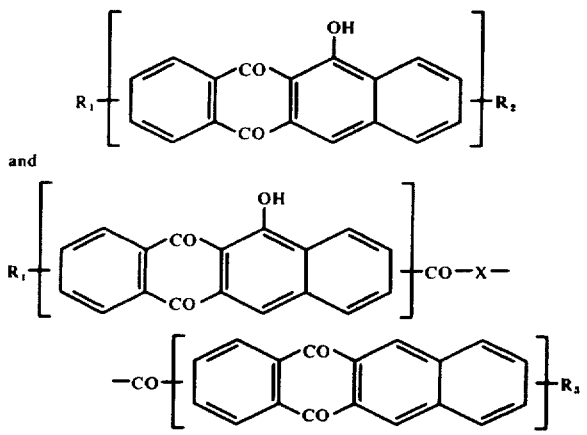

wherein $R_1$ and $R_3$ are members selected from the group consisting of hydrogen, chlorine, hydroxyl or amino, $R_2$ is a member selected from the group consisting of carboxyl or its derivative, sulfonamide, sulfonate and phenylsulfonate, X is a member selected from the group consisting of hydrazo and aromatic diamino.

Organic materials with the compound have a brilliant hue with characteristic fluorescence and high sublimation fastness.

10 Claims, No Drawings

COLORING RESINS BY MIXING NAPHTHACENEQUINONES THEREWITH

This is a division, of application Ser. No. 544,820 filed Jan. 28, 1975. U.S. Pat. No. 3986826 issued 10/19/76.

BACKGROUND OF THE INVENTION

This invention relates to a method for the coloring of organic materials, especially textiles, with naphthacenequinone derivatives.

The prior art has made little use naphthacenequinone derviatives as dyestuffs. It has been disclosed that the sulfonated compound obtained by the treatment of a naphthacenequinone derivative with concentrated sulfuric acid can be used as the acid dye for wool, in the journal of the Chemical Society, Vol., 91, 411–435 (1907), but the structure of the sulfonated naphthacenequinone derivative was not described. Furthermore, from the fact that these derivatives are not described in "Colour Index, 2nd Edition (1956) and its Supplement (1963)" edited by the Society of Dyers & Colourists and the American Association of Textile Chemists and Colourists or in "The Chemistry of Synthetic Dyes, Vol. I & II (1952) and Vol. III (1970)" written by K. Venkataramann, etc., it is obvious that the new naphthacenequinone derivatives have not been commercially used at all as dyestuffs. It has now been discovered, as a result of intensive colorant tests on organic materials colored with the new naphthacenequinone derivatives, that the compounds of formula (I) (below) colored the organic high molecular weight compounds in brilliant nuance with characteristic fluorescence and high sublimation fastness.

The present inventors, have previously discovered that certain naphthacenequinone derivatives can be effectively used as dye for the coloring of organic materials (US application no. 379,482 filed on July 16, 1973). The remarkable difference between the previous invention and the present one is as follows:

The novel compounds of the present invention have unexpected sublimation fastness compared to the compounds of the previous invention, for example, the sublimation fastness of yellow-red dyeings with the compounds of the present invention is higher, 1 – 2 grades than the value of the yellow-red dyeings with the compounds of the previous invention as shown below.

| Invention | Compound | Shade of Polyester dyed article | Sublimation fastness |
|---|---|---|---|
| Present Invention | 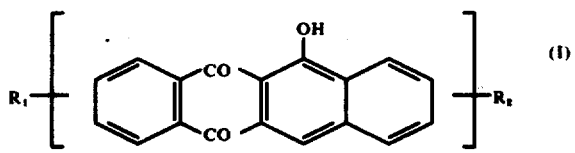 | Yellow | 4–5 |
| Previous Invention | 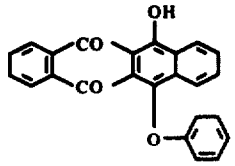 | " | 2–3 |

Besides, α-aminoanthraquinone, the most important intermediate for reddish disperse anthraquinone dye, is produced at present by amination of anthraquinone-1-sulfonic acid obtained by sulfonation of anthraquinone in the presence of mercury catalyst. Recently, the need to avoid environmental pollution by mercury has become an intense problem in the chemical industry. The new naphthacenequinone derivatives used in this invention be obtained without using mercury and can color in more brilliant nuance and with higher sublimation fastness than the anthraquinone derivatives.

SUMMARY OF THE INVENTION

This invention relates to the method of coloring an organic material with a naphthacenequinone derivative having the formula:

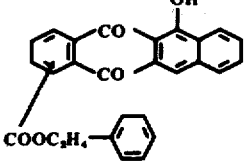

wherein $R_1$ and $R_2$ are substituents in optional positions on the nathphacenehydroguinone nucleus, $R_1$ being a member selected from the group consisting of hydrogen, chlorine, hydroxyl and amino, $R_2$ being a radical represented by the formula—$COOR_4$ wherein $R_4$ is a member selected from the group consisting of hydrogen, alkyl, alkoxyalkyl, cyclohexyl, aralkyl and a cation,

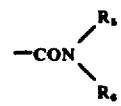

wherein $R_3$ and $R_4$ are members selected from the group consisting of hydrogen alkyl and aryl, —CONH-$R_7$ wherein $R_7$ is amino,

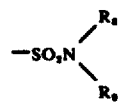

wherein $R_8$ and $R_9$ are hydrogen, alkyl, alkoxyalkyl, aryl,

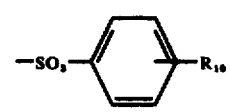

wherein $R_{10}$ is a member selected from the group consisting of methyl and chlorine and $-SO_3R_{11}$ wherein $R_{11}$ is a cation.

Organic materials which can be colored in accordance with the present invention include any synthetic or semisynthetic high molecular weight compound which can be formed into fibers, film, paint, extrudate, casting or molded article. The organic material may be a synthetic or semisynthetic resin such as amino-formaldehyde resin, for example, urea-formaldehyde or melamine-formaldehyde resin, polymers and copolymers of methacrylic acid ester, polymers and copolymers of vinyl chloride, polymers anc copolymers of vinylidene chloride, polymers and copolymers of olefins, for example, polyethylene and polypropylene, styrene polymers and copolymers, polyamide resins, polyester resins, polyacrylic resins, polyacetal resins, phenolic resins, alkyd resins, epoxy resins, cellulose acetate resins, nitro cellulose resins and ethyl cellulose resins.

DETAILED DESCRIPTION OF THE INVENTION:

The compounds of the formula (I) used in this invention can be prepared in a manner similar to that described in the Journal of the Chemical Society Vol. 91, P416–417; for example, the compound of the following formula (II) substituted with a carboxyl group can be obtained by the following reaction scheme.

such as tetrahydrofurfuryl alcohol, methyl cellosolve, butyl cellosolve or 3-methoxy-1-propanol or phenylated alcohols such as benzyl alcohol or phenethyl alcohol.

The carboxyamide group in the compound is derived from the ester group either by the reaction of the ester group with amines or by the reaction of the chlorides of the carboxylic group with amines. Thus, compounds having a carboxyamide group such as 6-amino-11-hydroxynaphthacene-5·12-quinone-2- or -3-carbanilide (Compound No. 24, mp. >300° C) are obtained.

When the proper diamines are used in the amidation described above, the amide of formula (III) with high melting point, poor solubility in solvents and pigment properties is obtained:

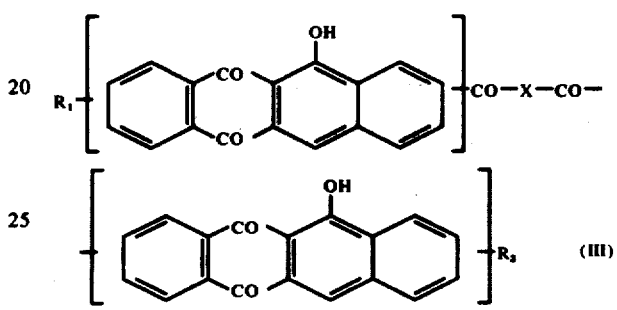

(III)

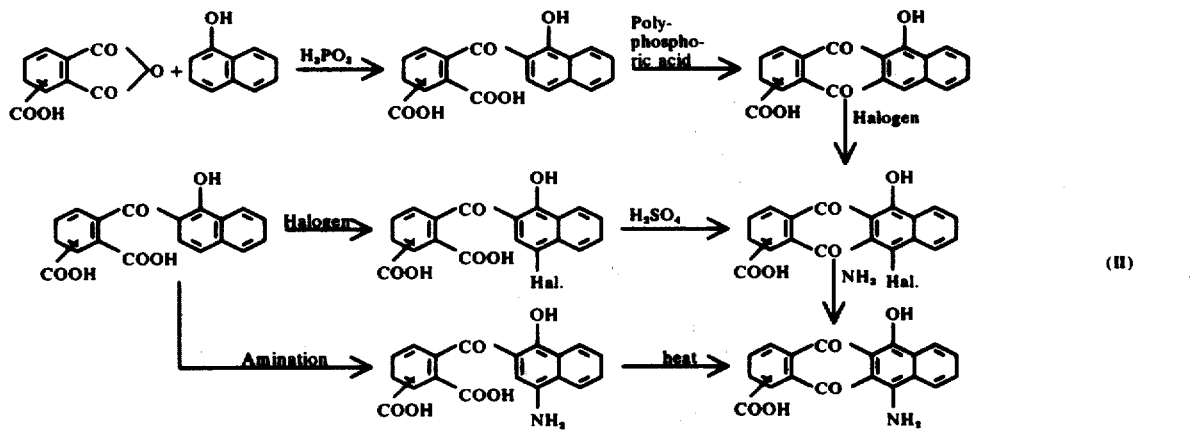

(II)

The carboxyl group in the compound is converted to its salts by a conventional procedure, and the carboxyl group is converted into an ester by boiling with an alcohol in the presence of sulfuric acid. Thus a compound having a carboxylate salt or an ester group in the molecule may be obtained such as Ba-6-hydroxynaphthacene-5·12-quinone-2- or -3-carboxylate (Compound No. 29 in Table 1), n-butyl-6-hydroxynaphthacene-5·12-quinone-2- or -3-carboxylate (Compound No. 3, mp. 131°–133° C), phenethyl-6-hydroxynaphthacene-5·12-quinone-2- or -3-carboxylate (Compound No. 6, mp. 162.5°–163.5° C), n-butyl6-amino-11-hydroxynaphthacene-5·12-quinone-2- or -3-carboxylate (Compound No. 21, mp. 155°–157° C), methoxyethyl-6-amino-11-hydroxynaphthacene-5·12-quinone-2- or 3-carboxylate (Compound No. 22, mp. 181°–183° C). Alcohols which are used in the esterification, for example, are saturated aliphatic alcohols such as methanol, ethanol, n-propanol, i-butanol, n-butanol, i-amyl alcohol, n-hexanol, cyclohexanol or 2-ethylhexanol, unsaturated alcohols such as allyl alcohol or crotonyl alcohol, oxygen-containing alcohols wherein $R_1$ and $R_2$ are the same as defined for formula (I), and —CO—X—CO— is substituted in optional positions in the compound, X is a member selected from the group consisting of hydrazo and aromatic diamine. It is recommended to use an inactive solvent with high boiling point such as o-dichlorobenzene, trichlorobenzene or nitrobenzene for a reaction medium in carrying out the amidation using the diamines.

Amines or diamines which are used in the amidation are ammonia, hydrazine, aliphatic primary or secondary amines such as methylamine, dimethylamine, butylamine, dibutylamine, hexylamine, octylamine or cyclohexylamine, substituted aliphatic amines such as γ-methoxypropylamine, γ-diethylaminopropylamine, β-cyanoethylamine or benzylamine, cyclic secondary amines such as piperidine, morpholine or dimethylmorpholine, aromatic amine such as aniline, methylaniline, toluidine, xylidine, chloroaniline, anisidine, phenethydine or naphthylamine, or aromatic diamines such as paramine, chloroparamine, metoxychloroparamine, m-toluilenediamine, p-xylenediamine, 1,5-naphthylenediamine, benzidine, dichlorobenzidine, tolidine, dianisidine, diaminodiphenylmethane, diaminodiphenyl ether, diaminodiphenylsulfone, diaminodiphenylsulfide, p,p'-diamino-α,α'-diphenylcyclohexane, diaminofluorene, diaminodibenzofurane, diaminodibenzothiophene dioxide, diaminoacridine, benzoguanamine, diaminodiphenylpropane, diaminoazobenzene, diaminostilbene or 2,7-diaminoanthraquinone.

The compound of the formula (I) having a sulfonate group or a sulfonamide group in its molecule is prepared by esterification or amidation after the chlorosulfonation of the naphthacenequinones with chlorosulfonic acid. Several alternate routes are recommend to prepare the compounds of the formula (I) having a particular substituent besides the sulfonate group or the sulfonamide group, as follows:

wherein X is a phenolic or amine residue. Thus, for example, 6-hydroxynaphthacene-5·12-quinone-11-sulfophenyl ester (Compound No. 11, mp. 225°–227° C) or 6-hydroxynaphthacene-5·12-quinone-11-sulfoethylamine (Compound No. 15, mp. 220°–222° C are obtained). The phenols which result the phenylesters by the reaction with the sulfochloride are, for example, phenol, cresol, chlorophenol or xylenol, and the amines which result the sulfonamides are the amines which are used for synthesizing the carboxyamides described previously.

In Table I, the typical examples of the compounds used for this invention are shown although the present invention is not limited thereto. For compounds No. 1–27, the shade of a polyester fabric dyed therewith using a dyeing procedure such as that described in Example 1 or 2 is specified, and the shade of pigment is shown for compounds No. 28–36.

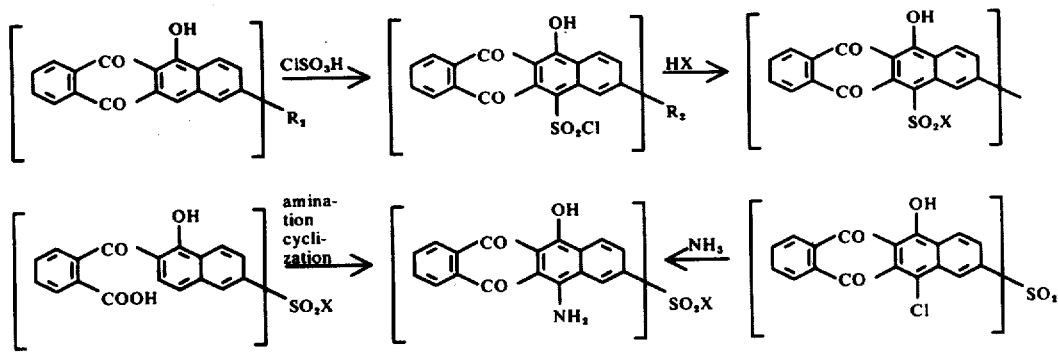

Table I

| Compound No. | Structural formula | Shade of the polyester dyed article or shade of pigment |
|---|---|---|
| 1 | (structure with COOH) | (Shade of the Polyester dyed article) Yellow |
| 2 | (structure with COOCH₃) | '' |
| 3 | (structure with COOC₄H₉-n) | '' |
| 4 | (structure with COO–cyclohexyl) | '' |

Table I-continued
| Compound No. | Structural formula | Shade of the polyester dyed article or shade of pigment |
|---|---|---|
| 5 | 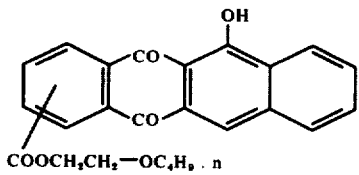 COOCH₂CH₂—OC₄H₉ . n | ″ |
| 6 | 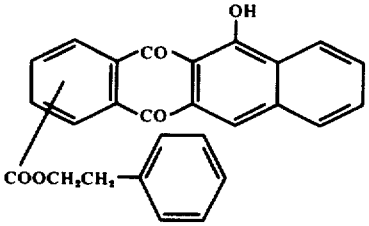 COOCH₂CH₂— | ″ |
| 7 | 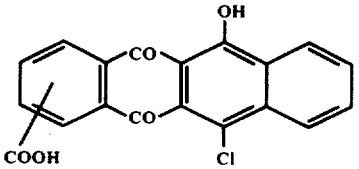 COOH | ″ |
| 8 | 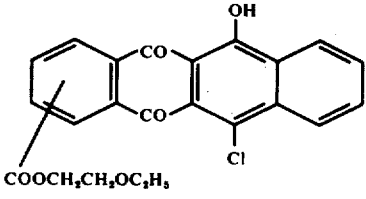 COOCH₂CH₂OC₂H₅ | ″ |
| 9 | 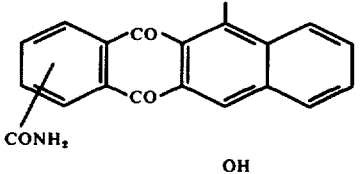 CONH₂ | ″ |
| 10 | 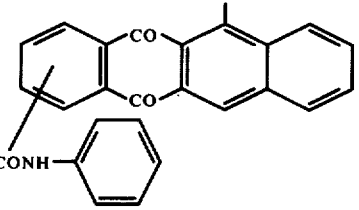 CONH— | ″ |
| 11 | 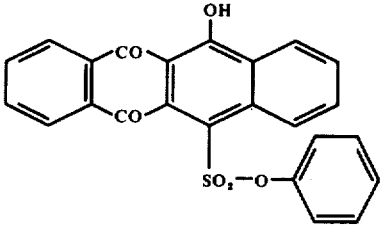 | ″ |
| 12 | 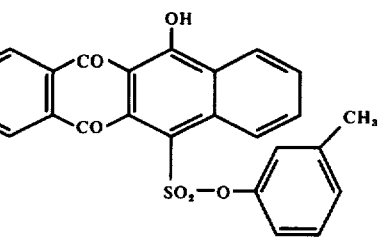 | ″ |

Table I-continued

| Compound No. | Structural formula | Shade of the polyester dyed article or shade of pigment |
|---|---|---|
| 13 | naphtho-dioxine with OH, Cl on benzene ring, SO$_2$–O–C$_6$H$_4$–CH$_3$ | " |
| 14 | naphtho-dioxine with OH, SO$_2$–O–C$_6$H$_4$–Cl (ortho) | " |
| 15 | naphtho-dioxine with OH, SO$_2$NHC$_2$H$_5$ | " |
| 16 | naphtho-dioxine with OH, SO$_2$NH–C$_6$H$_5$ | " |
| 17 | naphtho-dioxine with OH, Cl, SO$_2$O–C$_6$H$_4$–CH$_3$ | " |
| 18 | naphtho-dioxine with OH, OH | " |
| 19 | naphtho-dioxine with OH, NH$_2$, COOH | Violet-red |
| 20 | naphtho-dioxine with OH, NH$_2$, COOCH$_3$ | " |

Table I-continued

| Compound No. | Structural formula | Shade of the polyester dyed article or shade of pigment |
|---|---|---|
| 21 | [structure with COOC₄H₉-n, OH, NH₂] | " |
| 22 | [structure with COOCH₂CH₂OCH₃, OH, NH₂] | " |
| 23 | [structure with CONH₂, OH, NH₂] | " |
| 24 | [structure with CONHPh, OH, NH₂] | " |
| 25 | [structure with OH, NH₂, SO₂NH(CH₂)₂OCH₃] | Red |
| 26 | [structure with COOC₄H₉-i, OH, OH] | Orange |
| 27 | [structure with COOCH₂CH₂OC₂H₅, OH, OH] | " |

(The position of carboxyl group in the compounds Nos. 1, 2, 3, 4, 5, 6, 7, 8, 9, 10, 19, 20, 21, 22, 23, 24, 26, 27 is 2 or 3.)

| 28 | 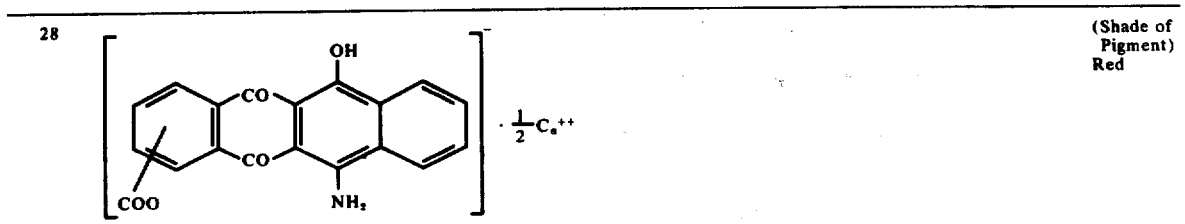 | (Shade of Pigment) Red |

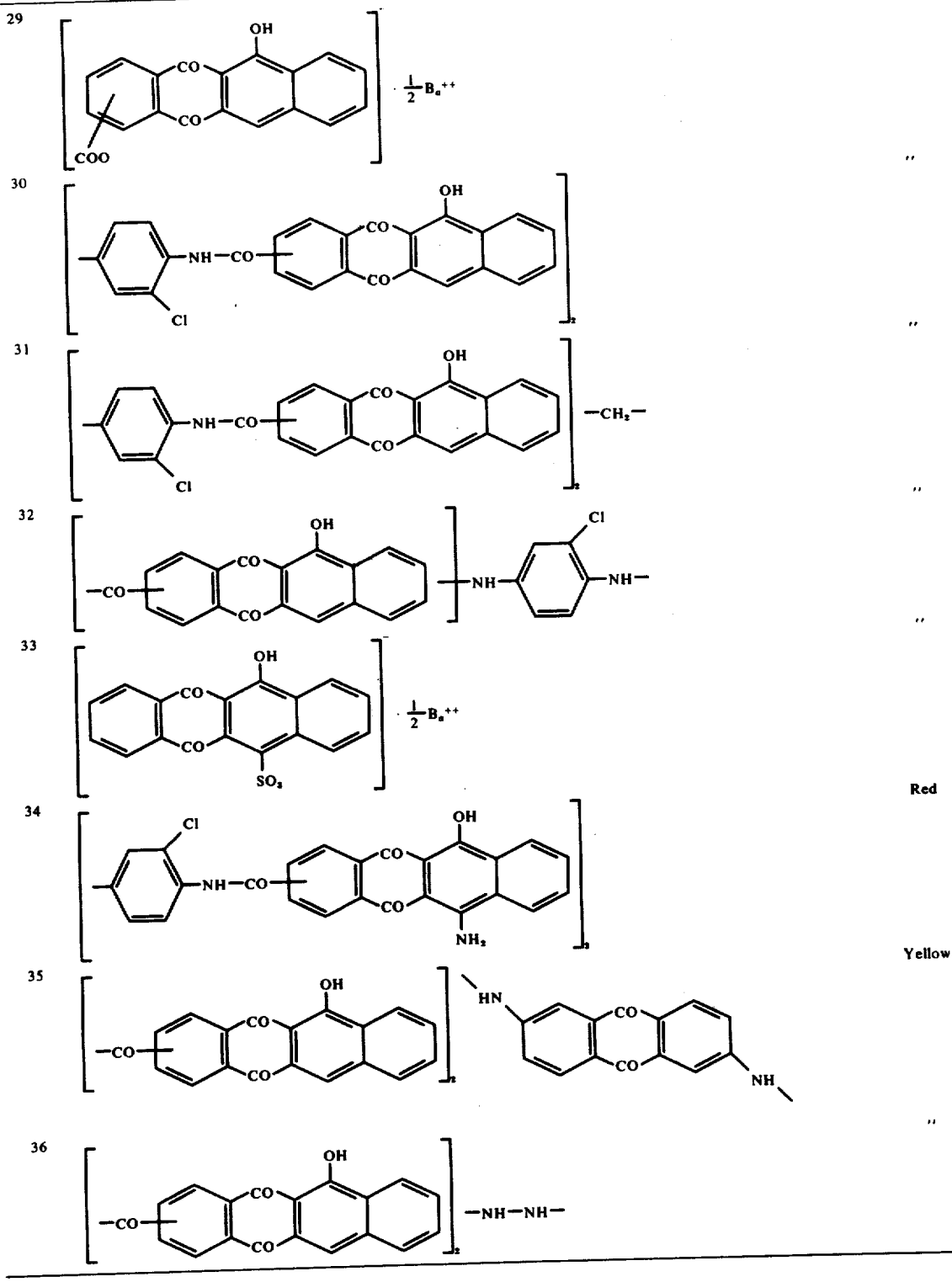

(The position of carboxyamide group in the compounds Nos. 28, 29, 30, 31, 32, 34, 35, 36 is 2 or 3.)

Organic materials can be easily colored with the compounds of the formula (I) by any ordinarily practiced method. For example, fibrous materials, such as yarns and fabrics, can be colored by fixing, at 50° to 140° C, in aqueous medium by the conventional exhausting method or at a proper temperature (e.g. 100° to 200° C) consistent with the type of fiber using dry heat by the conventional thermosol method.

Further, when the organic material to be colored is a film, coating, casting or a molded or extruded article, it can be colored by adding and mixing the compounds of the formula (I) with the resin or polymer during its preparation or before or during the forming of the substance into a film, coating, casting or a molded or extruded article.

As for the compounds of the formula (I) having pigment properties, it is advisable to use them in a finely pulverized state which is achieved by acid pasting or milling in organic solvent. The addition of a coating agent such as Ca- or Mg-stearate to the compound during its pulverization is effective for the preparation of a pigment with excellent properties. Also, a resin-based pigment can be obtained by a conventional method from the compounds of the formula (I).

The following examples are presented in which all parts are on weight basis and the compound No. refers to the compounds described in Table I.

EXAMPLE 1

1 part of n-butyl-6-amino-11-hydroxynaphthacene-5·12-quinone-2-or-3-carboxylate (Compound No. 21) was ground together with 0.5 part of sodium alkyl benzene sulfonate or alkylarylpolyoxyethylene ether as a surface active agent and 2 parts of water for a sufficient time to provide a finely granulated paste which was diluted with water to provide 10 parts of a finely granulated aqueous dispersion. 0.2 part of this dispersion was added to an aqueous bath containing 1 part of a higher alcohol sulfate type surfactant to provide 500 parts of treating bath. 10 parts of polyester cloth was immersed in this treating bath maintained at 130° C for 40 minutes and was water-washed and dried. The obtained dyed cloth showed a violet red color having a red fluorescence and its light fastness was higher than 5th grade (JIS L 0842 - 1971). Its sublimation fastness was 4-5th grade (JIS L 0879 - 1968-B, 180° C - 30 sec.). Similarly, dyed cloth showing similar color and similar fastnesses was obtained by using, instead of Compound No. 21 mentioned above, compounds No. 20, 22, 23 and 24 respectively.

EXAMPLE 2

One part of the dyestuff dispersion of Example 1 was dispersed in 20 parts of water containing 0.04 part of a polyoxyethylene alkyl ether type surface active agent. A polyester cloth was dipped in this aqueous dispersion and impregnated with the dispersion at a pick up of 40–50%. This treated cloth was dried, heat treated at 180° C for 1 minute, washed with a dilute surface active agent solution and was water-washed and dried to provide a dyed cloth similar to the one obtained in Example 1.

EXAMPLE 3

Phenethyl-6-hydroxynaphthacene-5·12-quinone-2- or -3-carboxylate (Compound No. 6) was finely dispersed in the same manner as described in Example 1, with this dispersion a color paste of the following recipe was printed in a pattern.

| | |
|---|---|
| Dispersion of dye | 3 parts |
| Water | 36 " |
| Stock thickening | 60 " |
| Anti reductant | 1 part |
| (Stock thickening was prepared as follows: | |
| Neugen ET | 1 part |
| (Surfactant made by Daiichi-Kogyo-Seiyaku K.K.) | |
| Water | 14 parts |
| Turpentine oil | 35 " |
| 5 % Sodium alginate water solution | 50 " |
| was thoroughly mixed in half emulsion.) | |

The printed cloth was steam-heated at 150° to 180° C for 3 to 5 minutes in a high temperature steamer, washed with a dilute solution of a surface active agent and was water washed and dried. The pattern of the cloth obtained showed clear yellow color with fluorescence, and its light fastness was 5th grade (JIS L-0842-1971), its sublimation fastness was 4 - 5th grade (JIS L-0879-1968-B). With the compounds No. 1–18, similar results were obtained.

EXAMPLE 4

A uniform mixture consisting of 0.1 part of 6-amino-11-hydroxynaphthacene-5·12-quinone-2- or 3-carboxyanilide (Compound No. 124), 50 parts of polyvinyl chloride and 50 parts of dioctylphthalate was kneaded at 150° C for 10 minutes and was then pressed for 5 minutes between metal plates heated to 160° C to make a sheet of a thickness of about 0.5 mm. The thus obtained sheet showed a violet red color with a good migration fastness.

EXAMPLE 5

A uniform mixture consisting of 0.01 part of phenyl-6-hydroxynaphthacene-5·12-quinone-11-sulfonate (Compound No. 12) and 10 parts of polystyrene was kneaded at 180° C for several minutes, and was then pressed to a disc of a 5 mm thickness. The disc showed a clear yellow color emitting fluorescence.

EXAMPLE 6

20 parts of unmodified melamine-formaldehyde were mixed into 50 parts of a sulfonamide resin melted at 120° C. The resulting mixture was heated to 170°–180° C and 1 part of 6-hydroxy-11-aminonaphthacene-5·12-quinone-2- or -3-carboxylic acid (Compound No. 19) was added into the mixture. The mixture was completely dissolved, then cooled, solidified and then crushed to obtain a violet-red fluorescence pigment emitting a red fluorescence.

EXAMPLE 7

Ca-6-amino-11-hydroxynaphthacene-5·12-quinone-2-or -3-carboxylate (Compound No. 28) was finely pulverized by milling in ethanol for a long time, dried, and mixed with a equal amount of Ca-stearate. One part of the obtained pigment was kneaded with 200 parts of polypropyrene and a minute amount of 2,6-di-tert. butyl-4-cresol at 230° C to provide a uniform mixture. Then the mixture was cast in a mould heated to 260° C to form a molding which showed a clear and stable red color. A similar colored molding was obtained with the Compound No. 34 similarly.

EXAMPLE 8

Bis-(6-hydroxynaphthacene-5·12-quinone-2- or -3-carboxa)-0·0'dichlorobenzidide (Compound No. 30) was dissolved in concentrated sulfuric acid, and the sulfuric acid solution was poured into ice-water. The precipitate was filtered, waterwashed and dried. The dried precipitate was blended with a equal amount of Ca-stearate to yield a yellow pigment. Coloring stoving varnish or paint with this pigment, provides a yellow film with good light fastness.

EXAMPLE 9

0.2 part of fine powder of bis(6-hydroxy-11-aminonaphthacene-5·12-quinone-2- or -3-)-0,0'- dichlorobenzidide (Compound No. 34) was added to a mixture of 100 parts of dimethylterephthalate, 62 parts of ethyleneglycol, 0.015 part of zinc acetate and 0.02 part of antimony trioxide and heated to 220° C for 4 hours out of contact with air, while the generated methanol was distilled off. One part of titanium dioxide suspended in 1 part of ethylene glycol was added to the reaction mixture, and the heating was continued for 4 hours. At the end of the reaction, the reaction mixture was heated up to 275° C to complete the condensation-polymerization. The thus obtained polymer was extruded form a filament with clear ed color.

What is claimed is:

1. A method for coloring a synthetic or semisynthetic organic resin comprising mixing said resin with a naphthacenequinone derivative having the formula:

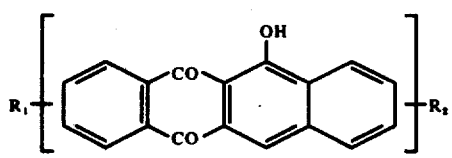

wherein $R_1$ is selected from the group consisting of hydrogen, chlorine, hydroxyl and amino; and $R_2$ is selected from the group consisting of
  i. -13 $COOR_4$ wherein $R_4$ is a member selected from the group consisting of hydrogen, alkyl, alkoxyalkyl, cyclohexyl, aralkyl and cations;
  ii.

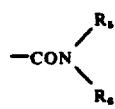

wherein $R_5$ and $R_6$ are members selected from the group consisting of hydrogen, alkyl and aryl;
  iii. —CONH—$R_7$ wherein $R_7$ is amino;
  iv.

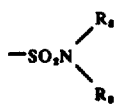

wherein $R_8$ and $R_9$ are hydrogen, alkyl, alkoxyalkyl, and aryl;
  v.

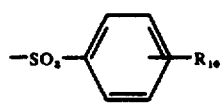

wherein $R_{10}$ is a member selected from the group consisting of methyl or chlorine;
  vi. —$SO_3$—$R_{11}$ wherein $R_{11}$ is a cation; and

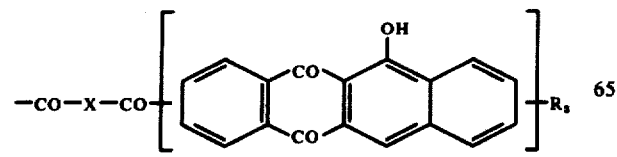

substituted at an optional position and wherein X is hydrazo or aromatic diamino and $R_3$ is optionally positioned and is selected from the group consisting of hydrogen, chlorine, hydroxyl and amino.

2. The method of claim 1 wherein said resin is selected from the group consisting of aminoformaldehyde resins, polymers and copolymers of methacrylic acid esters, polymers and copolymers of vinyl chloride, polymers and copolymers of vinylidene chloride, polymers and copolymers of olefins, polymers and copolymers of styrene, polyamides, polyesters, polyacrylic resins, polyacetals and cellulose esters.

3. The method as claimed in claim 1, wherein the napththacenequinone derivative is a member selected from the group consisting of the compound having the formula:

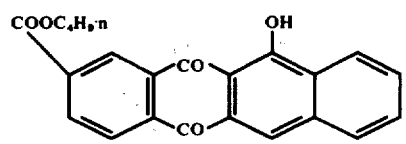

and the compound having the formula:

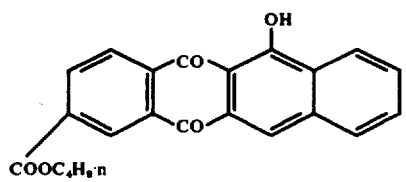

4. The method as claimed in claim 1, wherein the naphthacenequinone derivative is a member selected from the group consisting of the compound having the formula:

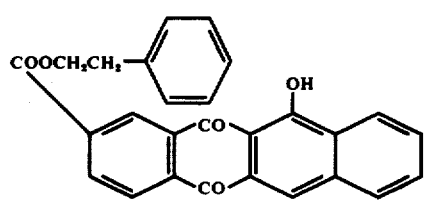

and the compound having the formula:

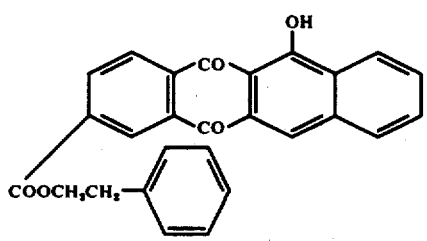

5. The method as claimed in claim 1, wherein the naphthacenequinone derivative is the compound of the formula:

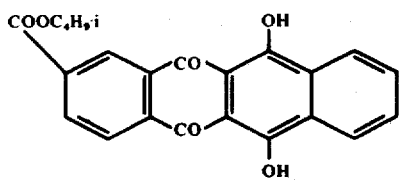

6. The method as claimed in claim 1, wherein the naphthacenequinone derivative is a member selected from the group consisting of the compound having the formula:

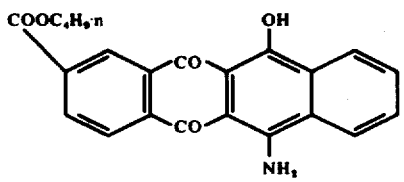

and the compound of the formula:

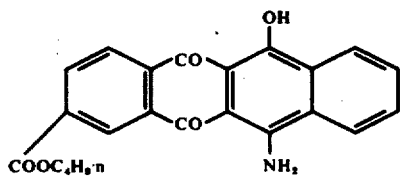

7. The method as claimed in claim 1, wherein the naphthacenequinone derivative is a member selected from the group consisting of the compound having the formula:

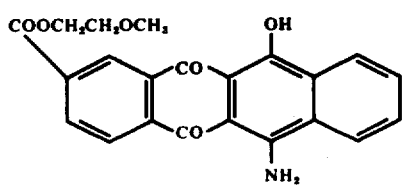

and the compound having the formula:

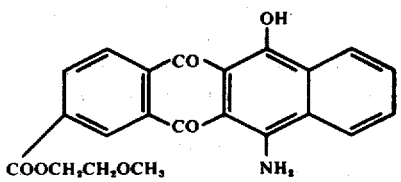

8. The method as claimed in claim 1, wherein the naphthacenequinone derivative is the compound having the formula:

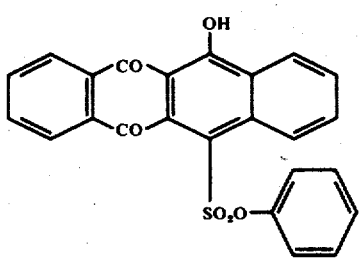

9. The method as claimed in claim 1, wherein the naphthacenequinone derivative is a member selected from the group consisting of the compound having the formula:

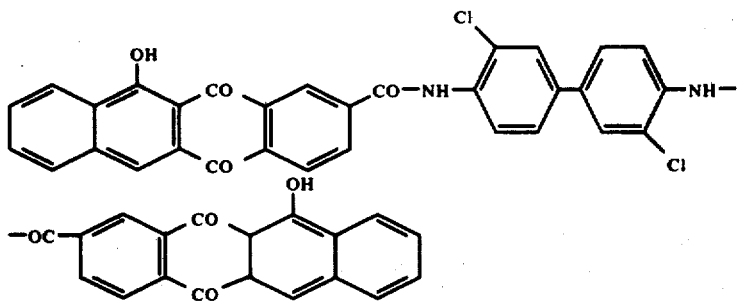

and the compound having the formula:

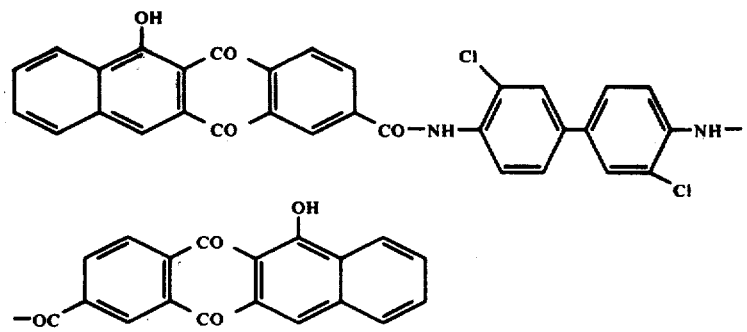

10. The method as claimed in claim 1, wherein the naphthacenequinone derivative is a member selected from the group consisting of the compound having the formula:
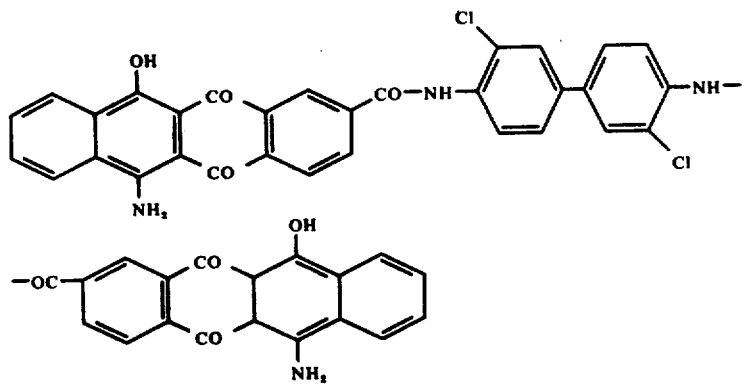
and the compound of the formula:
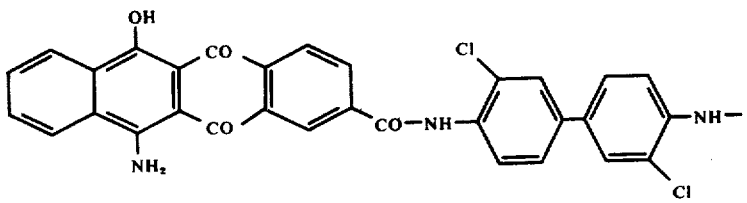
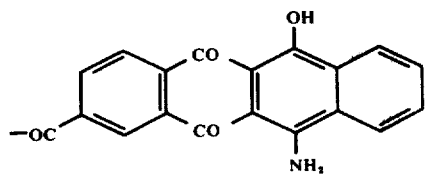
* * * * *